W. WALTER.
Nut-Lock.

No. 205,222. Patented June 25, 1878.

Witnesses.
J. W. Garner
W. S. D. Haines

Inventor
Wm. Walters,
per
J. A. Lehmann,
Atty.

UNITED STATES PATENT OFFICE.

WILLIAM WALTER, OF LATROBE, PENNSYLVANIA.

IMPROVEMENT IN NUT-LOCKS.

Specification forming part of Letters Patent No. 205,222, dated June 25, 1878; application filed May 28, 1878.

*To all whom it may concern:*

Be it known that I, WILLIAM WALTER, of Latrobe, in the county of Westmoreland and State of Pennsylvania, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks; and it consists of the combination of a common bolt and nut with a washer having a lip on one side and a key having one or more inclined edges, whereby the nut is prevented from becoming unscrewed, as will be more fully described hereinafter.

Figure 1:
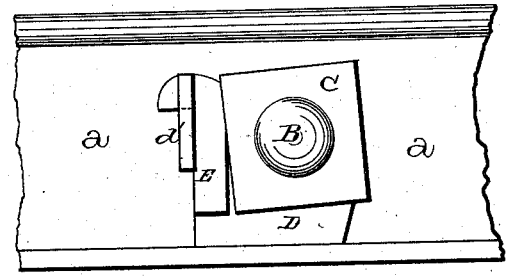
Figure 2:
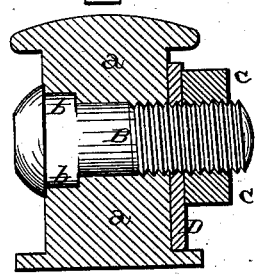
Figure 3:
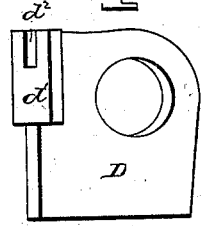
Figure 4:
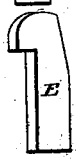

Figure 1 is a side elevation of my invention complete. Fig. 2 is a vertical section of the same. Figs. 3 and 4 are detached views of the washer and key, respectively.

$a$ represents a common rail; B, the bolt; and C, the nut. The bolt B has the enlargements $b$ made upon opposite sides next to the head, so as to prevent the bolt from turning around in the rail.

Between the nut and the rail is placed the washer D, which consists of the flat perforated plate, as shown, having the lip $d^1$ formed upon one corner. Made in this lip $d^1$, on a level with the surface of the washer, is the slot or recess $d^2$, in which the head of the key E catches. This key consists of the flat plate having a head or projection on one corner, so as to support it in position, and has its edge beveled away just opposite the head from about its center.

After the nut has been screwed into position, the key is inserted between it and the lip, as shown in Fig. 1, and then the nut is turned backward, so as to bear against the inclined edge, which serves to hold the key in position, and the key prevents the nut from unscrewing.

The lower edge of the washer D is, preferably, made straight, as here shown, so as to catch against the flange on the rail or any other projecting surface, and thus prevents it from turning around with the nut.

I claim—

The combination of the bolt B, washer D, having the lip $d^1$, nut C, and key E, having an inclined edge, substantially as shown.

In testimony that I claim the foregoing I have hereunto set my hand this 24th day of May, 1878.

WILLIAM WALTER.

Witnesses:
W. F. WHITE,
H. AUSSLER.